United States Patent
Yamaguchi et al.

(10) Patent No.: US 10,550,282 B2
(45) Date of Patent: Feb. 4, 2020

(54) CATIONIC ELECTRODEPOSITION COATING COMPOSITION

(71) Applicants: TOYOTA JIDOSHA KABUSHIKI KAISHA, Aichi (JP); KANSAI PAINT CO., LTD., Hyogo (JP)

(72) Inventors: Takeo Yamaguchi, Aichi (JP); Motohide Mori, Aichi (JP); Masahiro Nakamura, Aichi (JP); Hiroshi Hosono, Aichi (JP); Minoru Hanatani, Aichi (JP); Shigetaka Setodoi, Aichi (JP)

(73) Assignees: TOYOTA JIDOSHA KABUSHIKI KAISHA, Aichi (JP); KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 14/992,092

(22) Filed: Jan. 11, 2016

(65) Prior Publication Data

US 2016/0208133 A1    Jul. 21, 2016

(30) Foreign Application Priority Data

Jan. 20, 2015 (JP) .................. 2015-008969

(51) Int. Cl.
*C09D 163/00* (2006.01)
*C08G 59/06* (2006.01)
(Continued)

(52) U.S. Cl.
CPC ......... *C09D 163/00* (2013.01); *C08G 59/066* (2013.01); *C08G 59/28* (2013.01); *C08G 59/4028* (2013.01)

(58) Field of Classification Search
CPC .. C08G 59/066; C08G 59/28; C08G 59/4028; C09D 163/00
(Continued)

(56) References Cited

U.S. PATENT DOCUMENTS 3,649,589 A * 3/1972 Mayfield ................. C08L 63/00
523/450
3,947,339 A   3/1976 Jerabek et al.
(Continued)

FOREIGN PATENT DOCUMENTS

CN        1891773       1/2007
CN      101307200      11/2008
(Continued)

OTHER PUBLICATIONS

Chinese Office Action, dated Jul. 10, 2017, in corresponding Chinese Patent Application No. 201610034716.2, with English language translation.
(Continued)

*Primary Examiner* — David T Karst
(74) *Attorney, Agent, or Firm* — Wenderoth, Lind & Ponack, L.L.P.

(57) ABSTRACT

An object of the present invention is to find a cationic electrodeposition coating composition excellent in throwing power, anti-GA gas pinhole properties, and anti-corrosion properties, and to provide a coated article excellent in these coating film properties. The present invention provides a cationic electrodeposition coating composition containing an amino-containing epoxy resin (A), a blocked polyisocyanate curing agent (B), and a pigment (C), the amino-containing epoxy resin (A) being obtained by reacting an epoxy resin (A1), a polyphenol compound (A2), a dimer acid diglycidyl ester (A3), and an amine compound (A4).

6 Claims, 1 Drawing Sheet

(51) Int. Cl.
*C08G 59/28* (2006.01)
*C08G 59/40* (2006.01)

(58) Field of Classification Search
USPC .......................................................... 428/418
See application file for complete search history.

(56) References Cited

U.S. PATENT DOCUMENTS

| | | | |
|---|---|---|---|
| 4,868,230 A | | 9/1989 | Rao et al. |
| 4,883,572 A | | 11/1989 | Rao et al. |
| 5,374,340 A | * | 12/1994 | Ott ..................... C08G 59/1444 204/500 |
| 6,274,649 B1 | * | 8/2001 | Ott ....................... C08G 59/182 523/404 |
| 2008/0287612 A1 | | 11/2008 | Nishiguchi et al. |
| 2011/0062026 A1 | * | 3/2011 | Nishiguchi .......... C09D 5/4438 205/50 |

FOREIGN PATENT DOCUMENTS

| | | |
|---|---|---|
| CN | 101568608 | 10/2009 |
| JP | 2001-31739 | 2/2001 |
| JP | 2008-239989 | 10/2008 |
| JP | 2013-241582 | 12/2013 |

OTHER PUBLICATIONS

Search Report dated Aug. 14, 2017 in corresponding Turkish Patent Application No. 2016/00785, with English translation.

* cited by examiner

CATIONIC ELECTRODEPOSITION COATING COMPOSITION

TECHNICAL FIELD

The present invention relates to a cationic electrodeposition coating composition excellent in throwing power, anti-GA gas pinhole properties, and anti-corrosion properties.

BACKGROUND ART

Traditional cationic electrodeposition coating compositions are excellent in coating workability, and their coating films are also excellent in anti-corrosion properties; thus, the compositions have been widely used on automobile bodies, automobile parts, electrical equipment parts, and other industrial machinery, which are required to have such properties. These cationic electrodeposition coating compositions, however, have unsatisfactory throwing power for interior panel portions, compared with the throwing power for the exterior panel portions, and an electrodeposition coating film of about 10 μm is formed on interior panel portions, compared with an electrodeposition coating film of about 40 μm formed on exterior panel portions, particularly with welded portions having insufficient anti-corrosion properties. To address this drawback, there have been proposed a variety of cationic electrodeposition coating compositions satisfactory in throwing power and anti-corrosion properties.

For example, in Patent Literature 1, an electrodeposition coating composition contains a polyester resin to improve the throwing power and anti-corrosion properties. However, the composition may be unsatisfactory in long-term storage. In Patent Literature 2, a dimer acid is modified into an epoxy resin for a base resin to improve the anti-corrosion properties. However, the throwing power and anti-GA gas pinhole properties may not both be sufficiently achieved.

As used herein, the term "GA gas pinhole" refers to a hole formed as follows: when hydrogen gas generated in electrodeposition coating discharges an electrical current, the electrical energy (spark discharge) cures part of a coating film, and thereby leaves pinholes after baking. When GA gas pinholes are formed, the finished appearance and anti-corrosion properties of the coating film further deteriorate.

CITATION LIST

Patent Literature

PTL 1: JP2013-241582A
PTL 2: JP2001-031739A

SUMMARY OF INVENTION

Technical Problem

An object of the present invention is to provide a cationic electrodeposition coating composition excellent in throwing power, anti-GA gas pinhole properties, and anti-corrosion properties, and to provide a coated article excellent in these coating film properties.

Solution to Problem

The present inventors conducted extensive research to achieve the above object and found that the object is achieved by a cationic electrodeposition coating composition comprising a specific amino-containing epoxy resin (A), a blocked polyisocyanate curing agent (B), and a pigment (C). The inventors then completed the present invention.

More specifically, the present invention provides the following cationic electrodeposition coating composition and coated article obtained by coating an article with the cationic electrodeposition coating composition by electrodeposition.

Item 1.
A cationic electrodeposition coating composition comprising:
an amino-containing epoxy resin (A),
a blocked polyisocyanate curing agent (B), and
a pigment (C),
the amino-containing epoxy resin (A) being obtained by reacting an epoxy resin (A1), a polyphenol compound (A2), a dimer acid diglycidyl ester (A3), and an amine compound (A4).

Item 2.
The cationic electrodeposition coating composition according to Item 1 wherein the dimer acid diglycidyl ester (A3) contains linear, branched, and/or cyclic hydrocarbon groups that altogether contain 10 to 150 carbon atoms.

Item 3.
The cationic electrodeposition coating composition according to Item 1 or 2 wherein the dimer acid diglycidyl ester (A3) is present in an amount of 0.1 to 50% by mass based on the solids content in the amino-containing epoxy resin (A).

Item 4.
The cationic electrodeposition coating composition according to any one of Items 1 to 3, the composition further comprising an amine-added resin for pigment dispersion (D), the amine-added resin (D) being obtained by reacting an epoxy resin with an amine compound.

Item 5.
A coating method, the method comprising immersing a metal article in a bath of the cationic electrodeposition coating composition according to any one of Items 1 to 4 to coat the metal article by electrodeposition.

Item 6.
A coated article obtained by the coating method according to Item 5.

Advantageous Effects of Invention

The electrodeposition coating composition according to the present invention can achieve both high throwing power of 20 μm or more for an interior panel and anti-GA gas pinhole properties, and can also improve anti-corrosion properties.

Specifically, automobile bodies and/or automobile parts coated with the composition according to the present invention experience less deterioration due to corrosion even after long periods of driving in environments where snow-melting salt has been applied.

DESCRIPTION OF EMBODIMENTS

Figure 1:
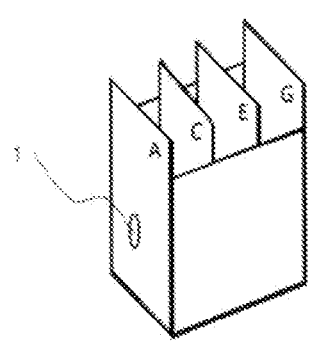
FIG. 1 is a diagram showing a jig used in the four-sheet box method throwing-power test for evaluation.

The present invention relates to a cationic electrodeposition coating composition comprising a specific amino-containing epoxy resin (A), a blocked polyisocyanate curing agent (B), and a pigment (C). The cationic electrodeposition coating composition can also be referred to as a cationic electrodeposition coating composition comprising an aqueous dispersion of components (A), (B), and (C). The following describes the present invention in detail.

Amino-Containing Epoxy Resin (A)

The amino-containing epoxy resin (A) usable in the cationic electrodeposition coating composition of the present invention can be obtained by reacting an epoxy resin (A1), a polyphenol compound (A2), a dimer acid diglycidyl ester (A3), and an amine compound (A4).

Epoxy Resin (A1)

The epoxy resin (A1) usable as a starting material for the amino-containing epoxy resin (A) is a compound comprising at least one epoxy group, and preferably two epoxy groups or more, per molecule. The molecular weight of the epoxy resin (A1) is not particularly limited. However, a preferable epoxy resin has a number average molecular weight within the range of, for example, at least 300, preferably 400 to 4,000, and more preferably 800 to 2,500. The epoxy equivalent of the epoxy resin (A1) is also not particularly limited. However, a preferable epoxy resin has an epoxy equivalent within the range of, for example, at least 160, preferably 180 to 2,500, and more preferably 400 to 1,500. For example, an epoxy resin obtained by reacting a polyphenol compound with epihalohydrin (e.g., epichlorohydrin) can be used.

A suitably usable polyphenol compound for preparing the epoxy resin (A1) can be the polyphenol compound (A2) described below.

A suitably usable epoxy resin (a) obtained by reacting a polyphenol compound with epihalohydrin is particularly the resins derived from bisphenol A represented by the following formula.

Among the resins, those represented by the formula with n being 0 to 8 are preferable.

Examples of commercially available epoxy resins include those sold by Mitsubishi Chemical Corporation under the trade names of jER828EL, jER1002, jER1004, and jER1007.

Polyphenol Compound (A2)

Known polyphenol compounds can be used, without any limitations, as the polyphenol compound (A2), a starting material for preparing the amino-containing epoxy resin (A). Specific examples include bis(4-hydroxyphenyl)-2,2-propane[bisphenol A], bis(4-hydroxyphenyl)methane[bisphenol F], bis(4-hydroxycyclohexyl)methane[hydrogenated bisphenol F], 2,2-bis(4-hydroxycyclohexyl)propane[hydrogenated bisphenol A], 4,4'-dihydroxybenzophenone, bis(4-hydroxyphenyl)-1,1-ethane, bis(4-hydroxyphenyl)-1,1-isobutane, bis(4-hydroxy-3-tert-butyl-phenyl)-2,2-propane, bis(2-hydroxy naphthyl)methane, tetra(4-hydroxyphenyl)-1,1,2,2-ethane, 4,4'-dihydroxydiphenyl sulfone, phenol novolac, and cresol novolac. These can be used singly or in combination of two or more.

Dimer Acid Diglycidyl Ester (A3)

The dimer acid diglycidyl ester (A3) usable as a starting material for preparing the amino-containing epoxy resin (A) is obtained by introducing glycidyl groups into a dimer acid obtained by dimerizing an unsaturated fatty acid, and the dimer acid diglycidyl ester preferably includes linear, branched, and/or cyclic hydrocarbon groups that altogether contain 10 to 150 carbon atoms.

Known unsaturated fatty acids can be used, without any limitations, as the unsaturated fatty acid. However, from the standpoint of the flexibility and hydrophobicity of the amino-containing epoxy resin (A), a higher unsaturated fatty acid containing 11 to 22 carbon atoms is preferable.

Known higher unsaturated fatty acids can be used, without any limitations, as the higher unsaturated fatty acid. Specific examples include oleic acid, linoleic acid, linolenic acid, eicosenoic acid, docosenoic acid, branched octadecenoic acid, branched hexadecenoic acid, and undecylenic acid. These can be used singly or in combination of two or more.

The process for producing the above-described dimer acid is disclosed in detail in JP2005-002085A. There are different types of dimer acids, such as cyclic dimer acids (monocyclic dimer acids, aromatic ring-containing dimer acids, and polycyclic dimer acids) and acyclic dimer acids. Of these, cyclic dimer acids are preferably used, and monocyclic dimer acids are more preferably used from the standpoint of the anti-corrosion properties and physical properties of coating film.

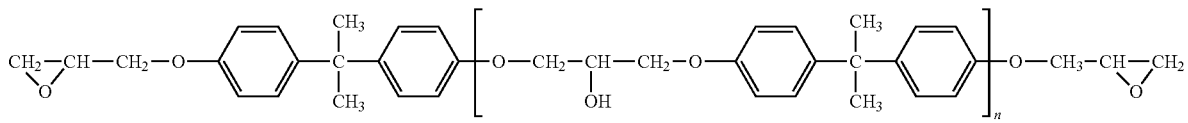

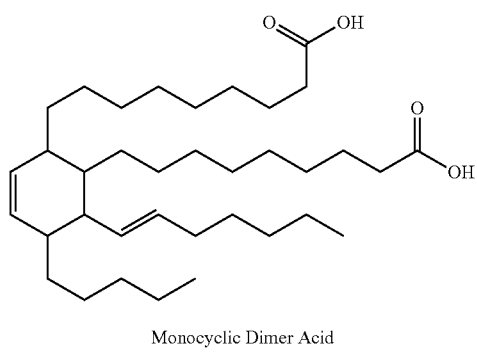

Monocyclic Dimer Acid

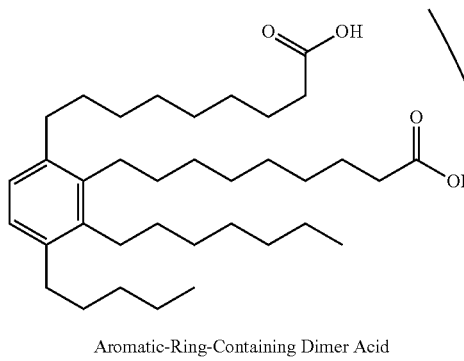

Aromatic-Ring-Containing Dimer Acid

Acyclic Dimer Acid

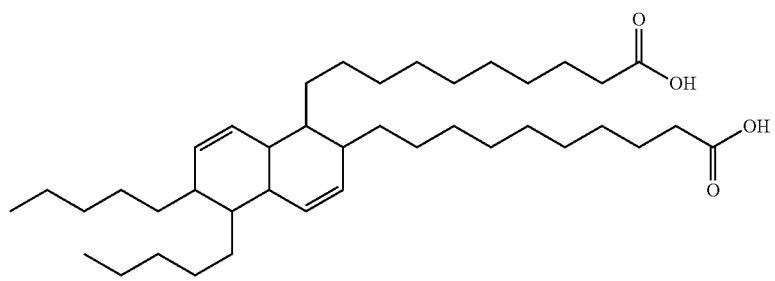

Polycyclic Dimer Acid

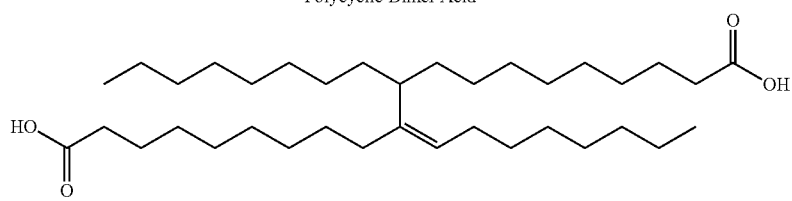

Acyclic Dimer Acid

The dimer acid diglycidyl ester (A3) preferably has an epoxy equivalent of 200 or more to less than 500, and more preferably 250 or more to less than 450. In the present invention, the number of carbon atoms of linear, branched, and/or cyclic hydrocarbon groups that are present in the dimer acid diglycidyl ester or a dimer acid used as a starting material for the dimer acid diglycidyl ester refers to the total number of carbon atoms present in a linear hydrocarbon group, branched hydrocarbon group, and/or cyclic hydrocarbon group that are all connected. Thus, for example, the number of carbon atoms present in the hydrocarbon group of the monocyclic dimer acid shown above is 34. The number of carbon atoms present in the hydrocarbon group of the aromatic-ring-containing dimer acid shown above is 34. The number of carbon atoms present in the hydrocarbon group of the polycyclic dimer acid shown above is 38. The number of carbon atoms present in the hydrocarbon group of the acyclic dimer acid shown above is 34.

Examples of commercially available products usable as the dimer acid diglycidyl ester (A3) include jER871 (Japan Epoxy Resin) and Epo Tohto YD-171 (Tohto Kasei Co., Ltd.).

The dimer acid diglycidyl ester (A3) is present in an amount of typically 0.1 to 50% by mass, preferably 1 to 40% by mass, and more preferably 3 to 30% by mass based on the solids content in the amino-containing epoxy resin (A).

When contained in these ranges, the dimer acid diglycidyl ester (A3) can provide excellent balance of the curability of the composition and the flexibility of the cured product. Because of the use of the dimer acid diglycidyl ester (A3) as a starting material for the amino-containing epoxy resin (A), the cationic electrodeposition coating composition of the present invention exhibits flexibility and hydrophobicity, while achieving both high throwing power of 20 μm or more for an interior panel and anti-GA gas pinhole properties, further showing improved anti-corrosion properties.

Amine Compound (A4)

The amine compound (A4) usable as a starting material for preparing the amino-containing epoxy resin (A) is not particularly limited as long as the amine compound is reactive with the epoxy resin (A1). Examples include monoalkyl amines or di-alkylamines, such as monomethylamine, dimethylamine, monoethylamine, diethylamine, dipropylamine, dibutylamine, dihexylamine, dioctylamine, monoisopropylamine, diisopropylamine, monobutylamine, monooctylamine, methylbutylamine, and dibutylamine; alkanolamines, such as monoethanolamine, N-methyl ethanolamine, N-ethyl ethanolamine, diethanolamine, mono(2-hydroxypropyl)amine, di(2-hydroxypropyl)amine, N-butylethanolamine, dipropanolamine, monomethylamino ethanol, N-(2-hydroxypropyl)ethylenediamine, 3-methylamino-1,2-propanediol, 3-tert-butylamino-1,2-propanediol, N-methylglucamine, and N-octyl glucamine; alkylene polyamines, such as polymethylenediamine, polyetherdiamine, ethylenediamine, propylenediamine, butylenediamine, hexamethylenediamine, trimethyl hexamethylenediamine, dimethylamino propylamine, diethylenetriamine, diethylamino propylamine, and bis(4-aminobutyl)amine; aromatic or alicyclic polyamines, such as menthenediamine, isophoronediamine, bis(4-amino-3-methylcyclohexyl)methane, meta-xylylene diamine, meta-phenylenediamine, naphthylene diamine, and dimethylamino methylbenzol; polyamines having a heterocyclic ring, such as piperazine, 1-methylpiperazine, 3-pyrrolidinol, 3-piperidinol, and 4-pyrrolidinol; epoxy-added polyamines obtained by adding 1 to 30 moles of an epoxy-containing compound to 1 mole of the polyamines listed above; polyamide polyamines containing at least one primary or secondary amine in the molecule of a polyamide resin generated by condensation of the polyamines listed above with an aromatic acid anhydride, a cyclic aliphatic acid anhydride, an aliphatic acid anhydride, a halogenated acid anhydride, and/or a dimer acid; and ketiminated amines obtained by reacting at least one primary or secondary amine of the polyamines listed above with a ketone compound. These can be used singly or in combination of two or more.

Ketone compounds for producing the ketiminated amines described above are not particularly limited as long as the ketone compounds are reactive with a primary or secondary amine of the polyamines described above to transform into a ketimine compound, and can be hydrolyzed in an aqueous coating composition. Examples include methyl isopropyl ketone (MIPK), diisobutyl ketone (DIBK), methyl isobutyl ketone (MIBK), diethyl ketone (DEK), ethyl butyl ketone (EBK), ethyl propyl ketone (EPK), dipropyl ketone (DPK), and methyl ethyl ketone (MEK). These ketones can be used singly or in combination of two or more.

Modifier

The amino-containing epoxy resin (A) usable in the cationic electrodeposition coating composition of the present invention may optionally be modified with a modifier. Examples of modifiers include xylene formaldehyde resins, polyether polyols, polyester polyols, fatty acids, phenols, alkylene glycols, monohydric alcohols, polyamide amines, polycarboxylic acids, polyisocyanate compounds, lactone compounds, catechol compounds, acrylic monomers, and compounds obtained by polymerizing acrylic monomers. These modifiers can be used singly or in combination of two or more.

Process for Producing Amino-Containing Epoxy Resin (A)

A reaction of an epoxy resin (A1), a polyphenol compound (A2), a dimer acid diglycidyl ester (A3), and an amine compound (A4), optionally with a modifier, can be performed in a suitable solvent at a temperature of about 80° C. to about 170° C., preferably about 90° C. to about 150° C. for about 1 to 6 hours, preferably about 1 to 5 hours in accordance with a known synthesis technique.

Examples of solvents include hydrocarbon-based solvents, such as toluene, xylene, cyclohexane, and n-hexane; ester-based solvents, such as methyl acetate, ethyl acetate, and butyl acetate; ketone-based solvents, such as acetone, methyl ethyl ketone, methyl isobutyl ketone, and methyl amyl ketone; amide-based solvents, such as dimethylformamide and dimethylacetamide; alcohol-based solvents, such as methanol, ethanol, n-propanol, and iso-propanol; etheralcohol-based compounds, such as ethylene glycol monobutyl ether, and diethylene glycol monoethyl ether; and mixtures thereof.

The amino-containing epoxy resin (A) preferably has a number average molecular weight within the range of typically 1,000 to 50,000, preferably 1,300 to 20,000, and more preferably 1,600 to 10,000 from the standpoint of the finished appearance and anti-corrosion properties. The amino-containing epoxy resin (A) has an amine value of typically 50 mgKOH/g or more, preferably within the range of 54 to 200 mgKOH/g, and more preferably 57 to 150 mgKOH/g based on the resin solids content.

The amine value as used herein is measured in accordance with JIS K 7237-1995. All of the amine values are based the resin solids content (mgKOH/g).

The number average molecular weight and weight average molecular weight as used herein were determined by converting the retention time (retention volume) measured by gel permeation chromatography (GPC) into a molecular weight, based on the retention time (retention volume) as measured under the same conditions for known polystyrene standards. Specifically, the number average molecular weight and weight average molecular weight can be measured using an HLC8120GPC gel permeation chromatograph (trade name, Tosoh Corporation) and four columns, specifically TSKgel G-4000HXL, TSKgel G-3000HXL, TSKgel G-2500HXL, and TSKgel G-2000HXL (trade names, all from Tosoh Corporation), with mobile-phase tetrahydrofuran at a measurement temperature of 40° C. and flow rate of 1 mL/min, with a detector RI.

Typically, a dimer acid can be modified in the amino-containing epoxy resin by the following three methods. However, the amino-containing epoxy resin (A) of the present invention produced a prominent effect when Method 3 was used.

Method 1: an epoxy resin and a dimer acid were subjected to a reaction.

Method 2: a dimer acid and diglycidyl ether of bisphenol A were subjected to a reaction, and the reaction product was subsequently reacted with an epoxy resin and/or a polyphenol compound.

Method 3: an epoxy resin, a polyphenol compound, and a dimer acid diglycidyl ester were subjected to a reaction.

Methods 1, 2, and 3 all skip an addition reaction of an amine compound. An addition reaction of an amine compound can be performed simultaneously with, or after, the reaction described above.

In Methods 1 and 2, when carboxyl groups of the dimer acid are reacted with glycidyl groups, hydroxyl groups generated by ring opening of glycidyl groups are reacted with other glycidyl groups; thus, the reaction of carboxyl groups with glycidyl groups is unlikely to proceed at a rate of 1/1. Further, the reaction of hydroxyl groups with glycidyl groups forms a three-dimensional structure, which may lead to unsatisfactory flexibility of the resulting coating film.

In addition, the use of a tertiary amine compound as a reaction catalyst produces a high polar quaternary salt, which may lower the throwing power and water resistance. The use of a primary amine compound or a secondary amine compound as a reaction catalyst may result in a lowered catalytic performance because these amine compounds react with glycidyl groups.

Blocked Polyisocyanate Curing Agent (B)

The blocked polyisocyanate curing agent (B) is an approximately stoichiometric addition reaction product of a polyisocyanate compound and an isocyanate blocking agent. Known polyisocyanate compounds can be used for the blocked polyisocyanate curing agent (B). Examples include aromatic, aliphatic, or alicyclic polyisocyanate compounds, such as tolylene diisocyanate, xylylene diisocyanate, phenylene diisocyanate, diphenyl methane-2,2'-diisocyanate, diphenylmethane-2,4'-diisocyanate, diphenyl methane-4,4'-diisocyanate, crude MDI [polymethylene polyphenyl isocyanate], bis(isocyanatemethyl)cyclohexane, tetramethylene diisocyanate, hexamethylene diisocyanate, methylene diisocyanate, and isophorone diisocyanate; cyclopolymers or biuret products of these polyisocyanate compounds; and mixtures thereof.

From the standpoint of the anti-corrosion properties, particularly more preferable polyisocyanate compounds are aromatic polyisocyanate compounds, such as tolylene diisocyanate, xylylene diisocyanate, phenylene diisocyanate, diphenylmethane-2,4'-diisocyanate, diphenyl methane-4,4'-diisocyanate, and crude MDI (preferably crude MDI, and the like).

The isocyanate blocking agent adds to the isocyanate groups of a polyisocyanate compound to block the isocyanate groups. The blocked polyisocyanate compound formed by the addition is stable at room temperature. However, when heated to a baking temperature for the coating film (typically, about 100 to about 200° C.), the isocyanate blocking agent preferably dissociates to thereby regenerate free isocyanate groups.

Examples of blocking agents for use in the blocked polyisocyanate curing agent (B) include oxime-based compounds, such as methyl ethyl ketoxime and cyclohexanone oxime; phenol-based compounds, such as phenol, para-t-butylphenol, and cresol; alcohol-based compounds, such as n-butanol, 2-ethyl hexanol, phenyl carbinol, methylphenyl carbinol, ethylene glycol monobutyl ether, diethylene glycol monoethyl ether, ethylene glycol, and propylene glycol; lactam-based compounds, such as ε-caprolactam and γ-butyrolactam; and active methylene-based compounds, such as dimethyl malonate, diethyl malonate, ethyl acetoacetate, methyl acetoacetate, and acetylacetone (preferably, alcohol-based compounds, and the like).

Pigment (C)

Known compositions can be used, without any limitations, as the pigment (C) for preparing the cationic electrodeposition coating composition of the present invention. Examples include coloring pigments, such as titanium oxide, carbon black, and colcothar; extenders, such as clay, mica, baryta, calcium carbonate, and silica; and metal compounds that can function primarily as an anti-corrosion pigment.

To improve the coating film curability, organic tin compounds, such as dibutyltin dibenzoate, dioctyltin oxide, and dibutyltin oxide, can be used.

These pigments are preferably added in an amount of 1 to 100 parts by mass, and particularly 10 to 50 parts by mass, per 100 parts by mass of the total resin solids content.

The pigment (C) is preferably mixed as a pigment dispersion paste with the coating composition. The pigment dispersion paste may be a dispersion of a pigment, such as coloring pigment, anti-corrosion pigment, and extender pigment, in ultra-fine particles, and can be prepared, for example, by mixing a resin for pigment dispersion, a neutralizer, and a pigment, and subjecting the mixture to a dispersing treatment in a dispersive mixer such as a ball mill, a sand mill, or a pebble mill.

Known resins for pigment dispersion can be used, without any limitations, as the resin for pigment dispersion and examples include epoxy resins or acrylic resins having hydroxy groups and cationic groups, surfactants, tertiary amine epoxy resins, quaternary ammonium salt epoxy resins, tertiary sulfonium salt epoxy resins, tertiary amine acrylic resins, quaternary ammonium salt acrylic resins, and tertiary sulfonium salt acrylic resins. Of these, preferable resins are amine-added resins for pigment dispersion that can be obtained by reacting an epoxy resin with an amine compound.

Cationic Electrodeposition Coating Composition

With respect to the amounts of the amino-containing epoxy resin (A) and the blocked polyisocyanate curing agent (B) present in the cationic electrodeposition coating composition of the present invention, in order to obtain a coated article having favorable throwing power, as well as excellent anti-GA gas pinhole properties and anti-corrosion properties, it is preferable that component (A) is present in an amount of 30 to 90 parts by mass, and preferably 40 to 85 parts by mass, whereas component (B) is present in an amount of 10 to 50 parts by mass, and preferably 15 to 45 parts by mass, based on the total parts by mass of the resin solids content of components (A) and (B). The amine value of the entire resin contained in the coating composition is typically 10 to 100 mgKOH/g, and preferably 20 to 90 mgKOH/g, based on the resin solids content.

The amounts of the individual components and the amine value of the entire resin outside the above ranges are not preferable because the coating composition characteristics or the coating film properties described above may be impaired.

The method for producing the cationic electrodeposition coating composition according to the present invention is not particularly limited. For example, the composition can be obtained by fully mixing the resin (A) and the curing agent (B), optionally with additives such as a surfactant and a surface control agent to prepare a resin, and dispersing the resin in water, followed by fully mixing the dispersion with a pigment dispersion paste, water, an organic solvent, and a neutralizer. Known organic acids can be used as a neutralizer without any limitations. In particular, formic acid, lactic acid, acetic acid, or a mixture thereof can be suitably used.

Method for Forming Coating Film

The present invention provides a method for forming a cationic electrodeposition coating film, and the method comprises a step of immersing an article in an electrodeposition bath containing the cationic electrodeposition coating composition, and a step of energizing the article as a negative electrode.

Examples of articles to be coated with the cationic electrodeposition coating composition of the present invention include automobile bodies, automobile parts, motorcycle parts, household appliances, and other equipment. The article to be coated is not particularly limited as long as it is a metal.

Examples of metal sheets to be coated include cold-rolled steel sheets, hot-rolled steel sheets, alloyed hot-dipped galvanized steel sheets, electro-galvanized steel sheets, electrolytic zinc-iron duplex plated steel sheets, organic composite plated steel sheets, Al materials, Mg materials, and sheets obtained by washing the surface of these metal sheets, optionally by using alkali degreasing, or the like, and subjecting the metal sheets to a surface treatment such as phosphate-based conversion treatment, chromate treatment, and complex oxide treatment.

The cationic electrodeposition coating composition can be applied onto the surface of a desired article to be coated by cationic electrodeposition coating. A cationic electrodeposition method typically comprises energizing an article to be coated as a negative electrode in a bath of a cationic electrodeposition coating composition diluted with deionized water, or the like, to achieve the solids content of about 5 to 40% by mass, and preferably 10 to 25% by mass with a pH adjusted to 4.0 to 9.0, and preferably 5.5 to 7.0, typically at a bath temperature of 15 to 35° C., and a load voltage of 100 to 400 V, and preferably 150 to 350 V. Typically, after electrodeposition coating, the coated article is fully washed with ultrafiltrate (UF filtrate), reverse-osmosis-treated water (RO water), industrial water, pure water, or the like to remove the excess cationic electrodeposition coating composition adhered to the article.

The thickness of the electrodeposition coating film is not particularly limited, and is typically within the range of 5 to 60 μm, and preferably 20 to 50 μm, on a dry film basis. Dry curing of the coating film is performed by heating the electrodeposition coating film at a temperature of the surface of the coated article of 110 to 200° C., preferably 140 to 180° C., for 10 to 180 minutes, and preferably 20 to 50 minutes, using a dryer such as an electric hot-air dryer or a gas hot-air dryer. The dry curing provides a cured coating film.

When electrodeposition coating is performed with the cationic electrodeposition coating composition of the present invention, a high coating voltage is applied for electrodeposition in order to obtain a film thickness in dimple-structured portions (interior panel portions). However, application of a high coating voltage is likely to form GA gas pinholes in a thin film on interior panel portions, or form an excessively thick film on exterior panel portions, using an increased amount of the coating composition. Therefore, to have a film thickness of 20 μm or more on interior panel portions, a high throwing power is desired that is expressed having the ratio of the interior panel film thickness (μm) to the exterior panel film thickness (μm) be typically 35% or more, and preferably 50% or more.

Thus, it is preferred that the polarization resistance value per unit thickness 3 minutes after the start of energization is typically in the range of 10 to 45 kΩ·cm²/μm, preferably 12 to 40 kΩ·cm²/μm, and more preferably 15 to 30 kΩ·cm²/μm.

When the polarization resistance value per unit thickness 3 minutes after the start of energization is 10 kΩ·cm²/μm or more, the throwing power is improved, whereas when the polarization resistance value per unit thickness 3 minutes after the start of energization is 45 kΩ·cm²/μm or less, a predetermined film thickness is easily obtained and the film-forming properties are enhanced; because this likely leads to improvement in anti-corrosion properties and finished appearance and anti-GA gas pinhole properties of thin film portions, the numerical range is preferable. Specifically, the polarization resistance value per unit thickness in the range of 10 to 45 kΩ·cm²/μm can achieve both coating film properties, such as anti-GA gas pinhole properties, and high throwing power of 20 μm or more on interior panel portions.

In the present invention, the polarization resistance value per unit thickness 3 minutes after the start of energization (kΩ·cm²/μm) is determined by dividing the polarization resistance value (kΩ·cm²/μm) by the film thickness (μm) on a dry film basis, and the polarization resistance value is obtained from the following equation (1) using the current value (A), applied voltage (V), and coated area (cm²) at a point of 3 minutes after electrodeposition coating performed for 3 minutes at an applied voltage (e.g., 250 V) in electrodeposition coating (under given conditions, for example, at a bath temperature of 28° C., an anode/cathode ratio of 1/2, and an inter-electrode distance of 10 cm).

Polarization Resistance Value (kΩ·cm²/μm)=Voltage (V)×Coated Area (cm²)/[Current Value (A) 3 Minutes after Electrodeposition Coating×1,000]   Equation (1):

EXAMPLES

Below, Production Examples, Examples, and Comparative Examples describe the present invention in more detail, but the present invention is not limited to these Examples. In the Examples, "parts" and "%" denote parts by mass and percent by mass, respectively.

Production of Amino-Containing Epoxy Resin (A)

Production Example 1: Production of Amino-Containing Epoxy Resin A-1

304 parts of jER828EL (Note 1), 668 parts of jER871 (Note 2), 137 parts of bisphenol A, and 0.2 parts of dimethylbenzylamine were added to a flask equipped with a stirrer, a thermometer, a nitrogen feeding tube, and a reflux condenser, and subjected to a reaction at 130° C. until the epoxy equivalent reached 560.

Subsequently, an amine compound (monomethylethanolamine: 68 parts, diethanolamine: 95 parts) was added to the reaction mixture, and further subjected to a reaction at 120° C. for 4 hours, followed by adjustment with ethylene glycol monobutyl ether, thereby obtaining a solution of an amino-containing epoxy resin A-1 with a solids content of 70%. The amino-containing epoxy resin A-1 had an amine value of 78 mgKOH/g.

Production Examples 2 to 8: Production of Amino-Containing Epoxy Resins A-2 to A-8

The procedure of Production Example 1 was repeated, except that the formulations were changed as shown in Table 1, thereby obtaining amino-containing epoxy resins A-2 to A-8 with a solids content of 70%.

TABLE 1

| Production Example | 1 | 2 | 3 | 4 | 5 | 6 | 7 | 8 |
|---|---|---|---|---|---|---|---|---|
| Amino-containing Epoxy Resin | A-1 | A-2 | A-3 | A-4 | A-5 | A-6 | A-7 | A-8 |
| jER828EL (Note 1) | 304 | 304 | 456 | 152 | 304 | 608 | | 608 |
| jER871 (Note 2) | 688 | | 344 | 1,032 | 688 | | 1,376 | |
| jER872 (Note 3) | | 1,040 | | | | | | |
| Bisphenol A | 137 | 137 | 137 | 137 | 137 | 23 | 137 | 137 |
| Tsunodime 216 (Note 4) | | | | | | 525 | | |
| Monomethylethanolamine | 68 | 68 | 68 | 68 | | 68 | 68 | 68 |
| Diethanolamine | 95 | 95 | 95 | 95 | 189 | 95 | 95 | 95 |
| Epoxy Equivalent (at the time amine compound was reacted) | 560 | 740 | 470 | 660 | 560 | 580 | 760 | 370 |
| Amine Value (mgKOH/g) | 78 | 61 | 92 | 68 | 77 | 77 | 60 | 111 |

In Table 1, "Epoxy Equivalent" denotes the epoxy equivalent at the time the amine compound was subjected to a reaction.

Note 1: trade name: jER828EL, Japan Epoxy Resin, epoxy resin, epoxy equivalent: 190, number average molecular weight: 350

Note 2: trade name: jER871, Mitsubishi Chemical Corporation, dimer acid diglycidyl ester (monocyclic), epoxy equivalent: 390 to 470, carbon number of the hydrocarbon group: 30 to 40

Note 3: trade name: jER872, Mitsubishi Chemical Corp., dimer acid diglycidyl ester (monocyclic), epoxy equivalent: 600 to 700, carbon number of the hydrocarbon group: 45 to 60

Note 4: trade name: Tsunodime 216, Tsuno Food Industrial Co., Ltd., dimer acid, acid value: 194 mgKOH/g Production of Blocked Polyisocyanate Curing Agent (B)

Production Example 9: Production of Curing Agent 270 parts of Cosmonate M-200 (trade name, Mitsui Chemicals, Inc., crude MDI) and 127 parts of methyl isobutyl ketone were added to a reactor and heated to 70° C. 236 parts of ethylene glycol monobutyl ether was added dropwise thereto over 1 hour and then heated to 100° C. While the temperature was maintained at 100° C., the reaction mixture was sampled over time to confirm the absence of absorption of unreacted isocyanate groups by infrared spectroscopy, thereby obtaining a blocked polyisocyanate curing agent with a resin solids content of 80%.

Production of Resin for Pigment Dispersion (D)

Production Example 10

1,010 parts of jER828EL (trade name, Mitsubishi Chemical Corporation, epoxy resin), 390 parts of bisphenol A, 240 parts of Placcel 212 (trade name, polycaprolactone diol, Daicel Corporation, weight average molecular weight: about 1,250) and 0.2 parts of dimethylbenzylamine were added to a flask equipped with a stirrer, a thermometer, a dropping funnel, and a reflux condenser, and the mixture was subjected to a reaction at 130° C. until the epoxy equivalent reached about 1,090. Subsequently, 150 parts of ethylene glycol monobutyl ether, 105 parts of diethanolamine, and 34 parts of N-methylethanolamine were added thereto, and the mixture was subjected to a reaction at 140° C. until the epoxy groups disappeared. Ethylene glycol monobutyl ether was then added to the reaction mixture to adjust the solids content, thereby obtaining an amine-added resin for pigment dispersion D-1 with a solids content of 60%.

Production Example 11

1,010 parts of jER828EL (trade name, Mitsubishi Chemical Corporation, epoxy resin), 390 parts of bisphenol A, 240 parts of Placcel 212 (trade name, polycaprolactone diol, Daicel Corporation, weight average molecular weight: about 1,250), and 0.2 parts of dimethylbenzylamine were added to a flask equipped with a stirrer, a thermometer, a dropping funnel, and a reflux condenser, and the mixture was subjected to a reaction at 130° C. until the epoxy equivalent reached about 1,090. Subsequently, 200 parts of ethylene glycol monobutyl ether, 122 parts of thiodiglycol, 200 parts of dimethylol propionic acid, and 100 parts of deionized water were added thereto, and the mixture was subjected to a reaction at 75° C. until the epoxy groups disappeared. Propylene glycol monomethyl ether was then added to the reaction mixture to adjust the solids content, thereby obtaining a resin for pigment dispersion D-2 that contains tertiary sulfonium salt groups and has a solids content of 60%.

Production of Pigment Dispersion Paste

Production Example 12: Production of Pigment Dispersion Paste No. 1

8.3 parts (solids content: 5 parts) of a solution of the amine-added resin for pigment dispersion D-1 obtained in Production Example 10, 13.5 parts of purified clay, 2.5 parts of carbon black, 1 part of dioctyltin oxide, and 18.7 parts of deionized water were mixed and dispersed with a ball mill for 20 hours, thereby obtaining a pigment dispersion paste No. 1 with a solids content of 50%.

Production Example 13: Production of Pigment Dispersion Paste No. 2

8.3 parts (solids content: 5 parts) of a solution of the tertiary sulfonium salt resin for pigment dispersion D-2 obtained in Production Example 11, 13.5 parts of purified clay, 2.5 parts of carbon black, 1 part of dioctyltin oxide, and 18.7 parts of deionized water were mixed, and dispersed with a ball mill for 20 hours, thereby obtaining a pigment dispersion paste No. 2 with a solids content of 50%.

Production of Cationic Electrodeposition Coating Composition

Examples 1: Production of Cationic Electrodeposition Coating Composition X-1

100 parts (solids content: 70 parts) of the solution of amino-containing epoxy resin A-1 obtained in Production Example 1 was mixed with 37.5 parts (solids content: 30 parts) of a solution of the blocked polyisocyanate curing agent obtained in Production Example 9, and the mixture was further mixed with 13 parts of 10% acetic acid and homogeneously stirred. Deionized water was gradually added dropwise to the mixture with vigorous stirring, thereby obtaining an emulsion with a solids content of 34%. Subsequently, 294 parts (solids content: 100 parts) of the emulsion was mixed with 44 parts (solids content: 22 parts) of the 50% pigment dispersion paste No. 1 obtained in Production Example 12, and the mixture was adjusted with deionized water, thereby producing a cationic electrodeposition coating composition X-1 with a solids content of 20%.

An electrodeposition coating bath was filled with the cationic electrodeposition coating composition X-1, and electrodeposition coating was performed at a bath temperature of 28° C., an anode/cathode ratio of 1/2, an interelectrode distance of 10 cm, and a voltage of 250 V. The polarization resistance value per unit thickness measured 3 minutes after the start of energization was 20 k$\Omega$·cm$^2$/µm.

Examples 2 to 6 and Comparative Examples 1 to 3: Cationic Electrodeposition Coating Compositions X-2 to X-9

The procedure of Example 1 was repeated except that the formulations were changed as shown in Table 2, thereby producing cationic electrodeposition coating compositions X-2 to X-9 with a solids content of 20%.

Evaluation tests were conducted for throwing power, anti-GA gas pinhole properties, and anti-corrosion properties in accordance with the procedures described below. Table 2 shows the results. Of the three evaluation tests, if at least one evaluation test results in rating "C," the coating composition is considered to be a failure.

TABLE 2

|  |  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| Cationic Electrodeposition Coating Composition |  | X-1 | X-2 | X-3 | X-4 | X-5 | X-6 | X-7 | X-8 | X-9 |
| (A) Amino-containing Epoxy Resin | Title | A-1 | A-2 | A-3 | A-4 | A-5 | A-1 | A-6 | A-7 | A-8 |
|  | Amount | 70 | 70 | 70 | 70 | 70 | 70 | 70 | 70 | 70 |
| (B) Blocked Polyisocyanate Curing Agent |  | 30 | 30 | 30 | 30 | 30 | 30 | 30 | 30 | 30 |
| (D) Resin for Pigment Dispersion | Amine-added Resin (D-1) | 5 | 5 | 5 | 5 | 5 |  | 5 | 5 | 5 |
|  | Sulfonium Salt Resin (D-2) |  |  |  |  |  | 5 |  |  |  |
| Evaluation Test | Throwing Power | A | A | B | A | B | A | B | A | C |
|  | Anti-GA Gas Pinhole Properties | A | A | B | A | A | B | C | A | C |
|  | Anti-corrosion Properties | A | B | A | B | B | A | A | C | A |

In Table 2, "Amount" indicates the value of solids content.

Evaluation Test

Throwing Power

Figure 2:
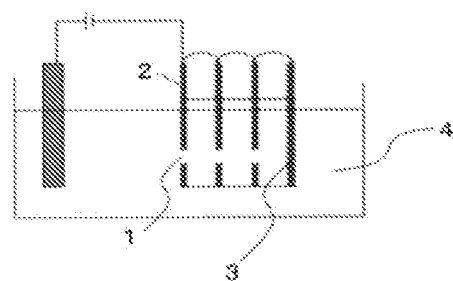
FIG. 2 is a diagram showing the throwing-power test for evaluation.

Holes with a diameter of 8 mm were made in four steel sheets, and the four steel sheets were positioned at 2-cm intervals to form a jig used in the four-sheet box method throwing-power test (see FIG. 1), and the jig was connected as shown in FIG. 2. Of the four steel sheets in FIG. 2, the left surface of the steel sheet furthest to the left was called "surface A" and the right surface was called "surface B." Similarly, the left and right surfaces of the second steel sheet from the left were called "surface C" and "surface D", respectively; the left and right surfaces of the third steel sheet from the left were called "surface E" and "surface F", respectively; and the left and right surfaces of the right-most steel sheet were called "surface G" and "surface H", respectively. Of these, surface A is referred to as "exterior panel," and surface G is referred to as "interior panel."

Electrodeposition coating was performed using the device shown in FIG. 2 by applying voltage such that the exterior panel (surface A) had a coating film of 50 μm on a dry film basis under the following conditions: coating bath temperature: 28° C.; distance between the surface A and the electrode: 10 cm; time for applying current: 3 minutes. The throwing power was evaluated based on the thickness of dry coating films on the interior panel (surface G).

Rating A or B indicates "pass" and rating C indicates "failure."
A: Surface G has a coating film with a thickness of 25 μm or more, showing markedly excellent throwing power
B: Surface G has a coating film with a thickness of 20 μm or more, and less than 25 μm, showing excellent throwing power
C: Surface G has a coating film with a thickness of less than 20 μm, showing inferior throwing power Anti-GA Gas Pinhole Properties Electrodeposition coating was performed on GA steel sheets (alloyed hot-dipped galvanized steel sheets), on which a phosphate chemical conversion treatment had been conducted beforehand, at a bath temperature of 28° C. under a load voltage such that the cured coating film had a thickness of 40 μm. After washing with water, the steel sheets were cured by heating at 170° C. for 30 minutes, and the number of generated pinholes per 100 cm² of the cured coating surface was examined.

Rating A or B indicates "pass" and rating C indicates "failure."
A: No pinhole
B: 5 to 10 pinholes generated
C: 10 or more pinholes generated Anti-Corrosion Properties Electrodeposition coating was performed on cold-rolled steel sheets (0.8 mm×150 mm×70 mm), which had been treated with zinc phosphate beforehand, at a bath temperature of 28° C. under a load voltage such that the cured coating film had a thickness of 20 μm. The steel sheets were cured by heating at 70° C. for 20 minutes, thereby obtaining test sheets.

Subsequently, the test sheets were cross-cut with a utility knife so that the cut reached the base of the test sheets. The test sheets were then subjected to a salt spray test at 35° C. for 840 hours in accordance with JIS Z-2371, and were rated based on the width of rust or blister on one surface of the cut portion according to the following criteria:
Rating A or B indicates "pass" and rating C indicates "failure."
A: The maximum width of rust or blister on one surface of the cut portion is 2.0 mm or less, showing markedly excellent anti-corrosion properties.
B: The maximum width of rust or blister on one surface of the cut portion is more than 2.0 mm and 3.0 mm or less, showing excellent anti-corrosion properties.
C: The maximum width of rust or blister on one surface of the cut portion is more than 3.0 mm, showing inferior anti-corrosion properties.

The invention claimed is:

1. A cationic electrodeposition coating composition comprising:
   an amino-containing epoxy resin (A),
   a blocked polymethylene polyphenyl isocyanate (MDI) (B), and
   a pigment (C),
   wherein the amino-containing epoxy resin (A) is obtained by reacting an epoxy resin (A1), a polyphenol compound (A2), a dimer acid diglycidyl ester (A3), and an amine compound (A4), and
   wherein the dimer acid of the dimer acid diglycidyl ester (A3) is a dimer of at least one unsaturated fatty acid selected from the group consisting of oleic acid, eicosenoic acid, docosenoic acid, branched octadecenoic acid, branched hexadecenoic acid and undecylenic acid.

2. The cationic electrodeposition coating composition according to claim 1, wherein the dimer acid diglycidyl ester (A3) contains linear, branched, and/or cyclic hydrocarbon groups that altogether contain 10 to 150 carbon atoms.

3. The cationic electrodeposition coating composition according to claim 1, wherein the dimer acid diglycidyl ester (A3) is present in an amount of 0.1 to 50% by mass based on the solids content in the amino-containing epoxy resin (A).

4. The cationic electrodeposition coating composition according to claim 1, further comprising an amine-added resin for pigment dispersion (D), wherein the amine-added resin (D) is obtained by reacting an epoxy resin with an amine compound.

5. A method of coating, comprising immersing a metal article in a bath of the cationic electrodeposition coating composition according to claim 1 to coat the metal article by electrodeposition.

6. A coated article obtained by the coating method according to claim 5.

\* \* \* \* \*